United States Patent
Gazzillo et al.

(10) Patent No.: US 9,389,842 B2
(45) Date of Patent: Jul. 12, 2016

(54) CONFIGURATION-PRESERVING PREPROCESSOR

(71) Applicants: Paul Gazzillo, Titusville, NJ (US); Robert Grimm, New York, NY (US)

(72) Inventors: Paul Gazzillo, Titusville, NJ (US); Robert Grimm, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 14/316,159

(22) Filed: Jun. 26, 2014

(65) Prior Publication Data

US 2014/0365995 A1 Dec. 11, 2014

Related U.S. Application Data

(63) Continuation of application No. 13/485,410, filed on May 31, 2012, now Pat. No. 8,806,456.

(51) Int. Cl.
*G06F 9/45* (2006.01)
*G06F 9/44* (2006.01)

(52) U.S. Cl.
CPC *G06F 8/423* (2013.01); *G06F 8/31* (2013.01); *G06F 8/425* (2013.01)

(58) Field of Classification Search
CPC ............ G06F 3/00; G06F 5/00; G06F 12/00; G06F 7/00; G06F 8/31; G06F 9/38; G06F 8/423; G06F 8/425
See application file for complete search history.

(56) References Cited

U.S. PATENT DOCUMENTS

| | | | | |
|---|---|---|---|---|
| 5,193,192 A | * | 3/1993 | Seberger | 717/143 |
| 5,613,118 A | * | 3/1997 | Heisch et al. | 717/158 |
| 2002/0100031 A1 | * | 7/2002 | Miranda et al. | 717/152 |
| 2003/0163801 A1 | * | 8/2003 | Thames et al. | 717/123 |
| 2004/0225871 A1 | * | 11/2004 | Irie et al. | 712/237 |
| 2005/0246693 A1 | * | 11/2005 | Plum | 717/140 |
| 2006/0225040 A1 | * | 10/2006 | Waddington | 717/122 |
| 2006/0225052 A1 | * | 10/2006 | Waddington et al. | 717/136 |
| 2006/0230378 A1 | * | 10/2006 | Waddington et al. | 717/100 |
| 2009/0313604 A1 | * | 12/2009 | Miceli | 717/120 |
| 2013/0055225 A1 | * | 2/2013 | Ravi et al. | 717/150 |

* cited by examiner

*Primary Examiner* — Tuan Vu
(74) *Attorney, Agent, or Firm* — Foley & Lardner LLP (57) ABSTRACT

Methods, systems, and apparatuses, including computer programs encoded on computer readable media, for generating a plurality of tokens from one or more source files. The one or more source files include source code in a first programming language. The source code includes one or more static conditionals that include a conditional expression and branch code that is operative when the conditional expression is true. Various configurations are possible based upon the conditionals. A first static conditional that includes one or more nested static conditionals within the branch code associated with the first static conditional is determined. Each of the one or more nested static conditionals is hoisted to a beginning of the branch code associated with the first static conditional. Each innermost branch code does not contain a static conditional, and each possible configuration is preserved.

18 Claims, 5 Drawing Sheets

CONFIGURATION-PRESERVING PREPROCESSOR

CROSS-REFERENCE TO RELATED PATENT APPLICATIONS

This application is a continuation of U.S. patent application Ser. No. 13/485,410, filed on May 31, 2012, which is incorporated herein by reference in its entirety.

GOVERNMENT RIGHTS

This invention was made with government support under Grant Nos. CNS-0448349, CNS-0615129, and CCF-1017849 awarded by the National Science Foundation. The government has certain rights in the invention.

BACKGROUND

Large-scale software development requires effective tool support, such as source code browsers, bug finders, and automated refactorings. This need is especially pressing for C, since it is the language of choice for critical software infrastructure, including the Linux kernel and Apache web server. However, building tools for C presents a special challenge. C is not only low-level and unsafe, but source code mixes two languages: the C language proper and the preprocessor. These tools, therefore, need to process C itself and the preprocessor. The preprocessor adds facilities lacking from C itself. Notably, file includes (#include) provide rudimentary modularity, macros (#define) enable code transformation with a function-like syntax, and static conditionals (#if, #ifdef, and so on) capture variability. The preprocessor is oblivious to C constructs and operates only on individual tokens. Real-world C code reflects both points: preprocessor usage is widespread and often violates C syntax.

Existing C tools do not process both languages. Rather, they either process one configuration at a time (e.g., the Cxref source browser, the Astree bug finder, and Xcode refactorings), rely on a single, maximal configuration (e.g., the Coverity bug finder), or build on incomplete heuristics (e.g., the LXR source browser and Eclipse refactorings). Processing one configuration at a time is infeasible for large programs such as Linux, which has over 10,000 configuration variables. Maximal configurations cover only part of the source code, mainly due to static conditionals with more than one branch. For example, Linux' allyesconfig enables less than 80% of the code blocks contained in conditionals. And heuristic algorithms prevent programmers from utilizing the full expressivity of C and its preprocessor.

SUMMARY

In general, one aspect of the subject matter described in this specification can be embodied in methods for Methods, systems, and apparatuses, including computer programs encoded on computer readable media, for generating a plurality of tokens from one or more source files. The one or more source files include source code in a first programming language. The source code includes one or more static conditionals that include a conditional expression and branch code that is operative when the conditional expression is true. Various configurations are possible based upon the conditionals. A first static conditional that includes one or more nested static conditionals within the branch code associated with the first static conditional is determined. Each of the one or more nested static conditionals is hoisted to a beginning of the branch code associated with the first static conditional. Each innermost branch code does not contain a static conditional, and each possible configuration is preserved. Each innermost branch code does not contain a static conditional and each possible configuration is preserved. Other implementations of this aspect include corresponding systems, apparatuses, and computer-readable media configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

C compilers, such as gcc, process only one variant of the source code at a time. They pick the one branch of each static conditional that matches the configuration variables passed to the preprocessor, e.g., through the -D command line option. Different configuration variable settings, or configurations, result in different executables, all from the same C sources. In contrast, other C tools, such as source browsers, bug finders, and automated refactorings, need to be configuration-preserving. They need to process all branches of static conditionals and, for each branch, track the presence condition enabling that branch. This considerably complicates C tools besides compilers, starting with preprocessing and parsing.

Figure 1:
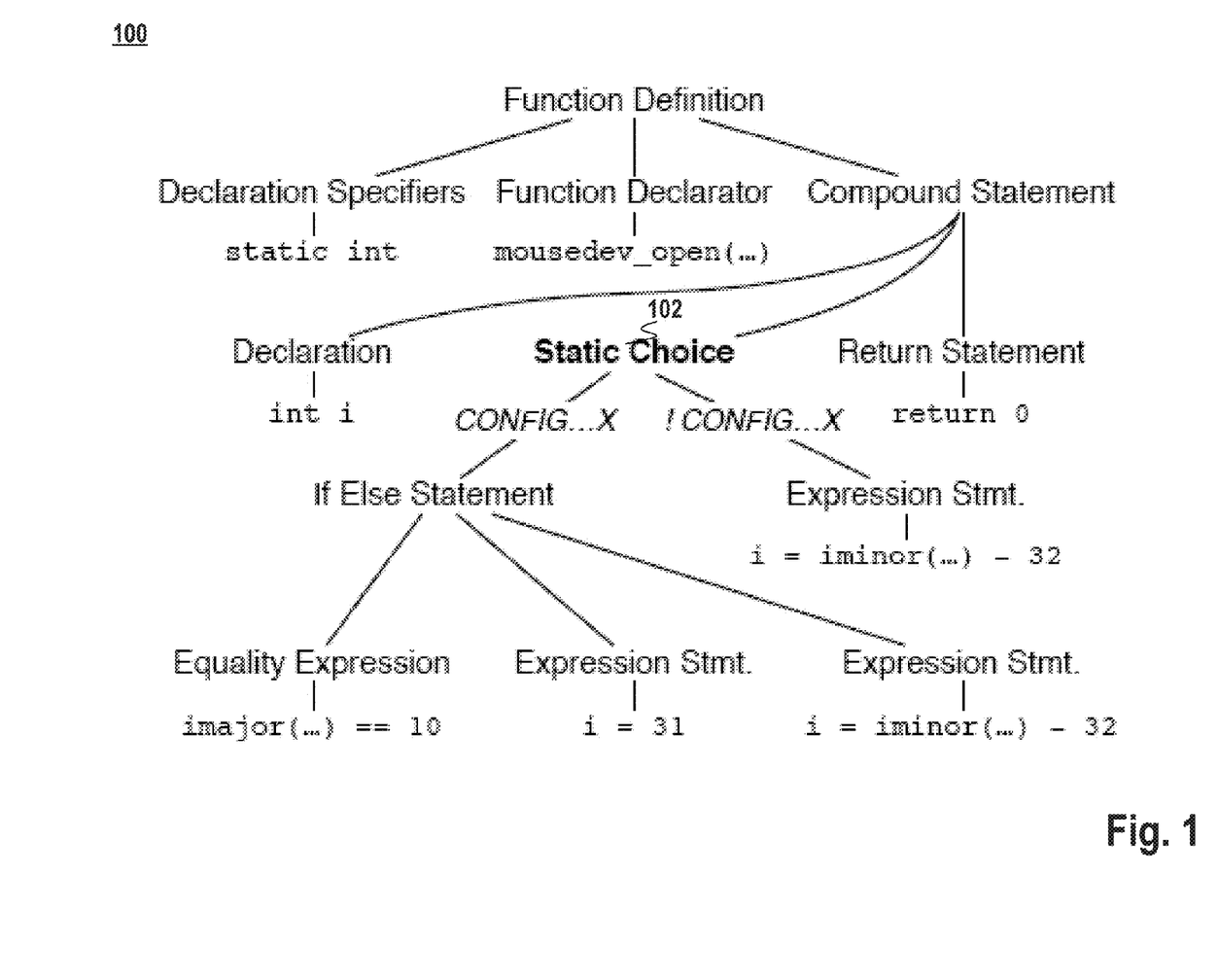
FIG. 1 illustrates an abstract syntax tree (AST) in accordance with an illustrative implementation.

FIG. 1 illustrates an implementation of configuration-preserving preprocessing and parsing on a simple example from the x86 Linux kernel (version 2.6.33.3, which is used throughout this description). Table 1 below shows the original source code, which utilizes the three main preprocessor facilities: an include directive on line 1, macro definitions on lines 3 and 4, and conditional directives on lines 10 and 14. The code has two configurations, one when CONFIG_INPUT_MOUSEDEV_PSAUX is defined and one when it is not defined. After preprocessing, shown in Table 2, the header file has been included (not shown) and the macros have been expanded on lines 6, 7, and 10, but the conditional directives remain on lines 5 and 9.

FIG. 1 illustrates an abstract source tree (AST) of the example shown in Table 2 in accordance with an illustrative implementation. The AST 100 contains both configurations with a static choice node 102 corresponding to the static conditional on lines 5-9 in Table 2.

TABLE 1

| 1 | #include "major.h" // Defines MISC_MAJOR to be 10 |
| --- | --- |
| 2 | |
| 3 | #define MOUSEDEV_MIX 31 |
| 4 | #define MOUSEDEV_MINOR_BASE 32 |
| 5 | |
| 6 | static int mousedev_open(struct inode *inode, struct file *file) |
| 7 | { |
| 8 |   int i; |
| 9 | |
| 10 | #ifdef CONFIG_INPUT_MOUSEDEV_PSAUX |
| 11 |   if (imajor(inode) == MISC_MAJOR) |
| 12 |     i = MOUSEDEV_MIX; |
| 13 |   else |

TABLE 1-continued

| 14 | #endif |
| --- | --- |
| 15 |   i = iminor(inode) – MOUSEDEV_MINOR_BASE; |
| 16 | |
| 17 |   return 0; |
| 18 | } |

TABLE 2

| 1 | static int mousedev_open(struct inode *inode, struct file *file) |
| --- | --- |
| 2 | { |
| 3 |   int i; |
| 4 | |
| 5 | #ifdef CONFIG_INPUT_MOUSEDEV_PSAUX |
| 6 |   if (imajor(inode) == 10) |
| 7 |     i = 31; |
| 8 |   else |
| 9 | #endif |
| 10 |     i = iminor(inode) – 32; |
| 11 | |
| 12 |   return 0; |
| 13 | } |

The complexity of configuration-preserving C processing stems from the interaction of preprocessor features with each other and with the C language. Table 3 summarizes these interactions. Rows denote language features and are grouped by the three steps of C processing: lexing, preprocessing, and parsing. The first column names the feature and the second column describes the implementation strategy. The remaining columns capture complications arising from the interaction of features, and the corresponding table entries indicate how to overcome the complications. Blank entries indicate impossible interactions. In various implementations, the configuration-preserving preprocessor addresses all interactions.

TABLE 3

| Language Construct | Implementation | Surrounded by Conditionals | Contain Conditionals | Contain Multiply-Defined Macros | Other |
| --- | --- | --- | --- | --- | --- |
| Lexer | | | | | |
| Layout | Annotate tokens | | | | |
| Preprocessor | | | | | |
| Macro (Un)Definition | Use conditional macro table | Add multiple entries to macro table | | Do not expand until invocation | Trim infeasible entries on redefinition |
| Object-Like Macro Invocations | Expand all definitions | Ignore infeasible definitions | | Expand nested macros | Get ground truth for built-ins from compiler |
| Function-Like Macro Invocations | Expand all definitions | Ignore infeasible definitions | Hoist conditionals around invocations | Expand nested macros | Support differing argument numbers and variadies |
| Token Pasting & Stringification | | Apply pasting & stringification | | Hoist conditionals around token pasting & stringification | |
| File Includes | Include and preprocess files | Preprocess under presence conditions | | Hoist conditionals around includes | Reinclude when guard macro is not false |
| Static Conditionals | Preprocess all branches | | Conjoin presence conditions | Ignore infeasible definitions | |
| Conditional Expressions | Evaluate presence conditions | | | Hoist conditionals around expressions | Presence order for non-boolean expressions |
| Error Directives | | Ignore infeasible branches | | | |
| Line, Warning, & Pragma Directives | Treat us layout | | | | |
| Parser | | | | | |
| C Constructs | Use FMLR Parser | Fork and merge subparsers | | | |
| Typedef Names | Use conditional symbol table | Add multiple entries to symbol table | | | Fork subparsers on ambiguous names |

Layout.

The first step is lexing. The lexer converts raw program text into tokens, stripping layout such as whitespace and comments. Since lexing is performed before preprocessing and parsing, it does not interact with the other two steps. However, automated refactorings, by definition, restructure source code and need to output program text as originally written, modulo any intended changes. Consequently, they need to annotate tokens with surrounding layout-plus, keep sufficient information about preprocessor operations to restore them as well.

Macro (Un)Definitions.

The second step is preprocessing. It collects macro definitions (#define) and undefinitions (#undef) in a macro table-with definitions being either object-like:

define name body or function-like define name (parameters) body

Definitions and undefinitions for the same macro may appear in different branches of static conditionals, creating a multiply-defined macro that depends on the configuration. Table 4 shows such a macro, BITS_PER_LONG, whose definition depends on the CONFIG_64BIT configuration variable. A configuration-preserving preprocessor can record all definitions in its macro table, tagging each entry with the presence condition of the #define directive while also removing infeasible entries on each update. The preprocessor can also record undefinitions, so that it can determine which macros are neither defined nor undefined and thus free, i.e., configuration variables. Wherever multiply-defined macros are used, they propagate an implicit conditional. It is as if the programmer had written an explicit conditional in the first place.

TABLE 4

1 #ifdef CONFIG_64BIT
2 #define BITS_PER_LONG 64
3 #else
4 #define BITS_PER_LONG 32
5 #endif Macro Invocations.

Since macros may be nested within each other, a configuration-preserving preprocessor, just like an ordinary preprocessor, can recursively expand each macro. Furthermore, since C compilers have built-in object-like macros, such as __STDG_VERSION__ to indicate the version of the C standard, the preprocessor can be configured with the ground truth of the targeted compiler.

Beyond these straightforward issues, a configuration-preserving preprocessor can handle two, more subtle interactions. First, a macro invocation may be surrounded by static conditionals. Consequently, the preprocessor can ignore macro definitions that are infeasible for the presence condition of the invocation site. Second, function-like macro invocations may contain conditionals, either explicitly in source code or implicitly through multiply-defined macros. These conditionals can alter the function-like macro invocation by changing its name or arguments, including their number and values. To preserve the function-like invocation while also allowing for differing argument numbers and variadics (a gcc extension) in different conditional branches, the preprocessor can hoist the conditionals around the invocation.

Tables 5 and 6 illustrate the latter issue. Table 5 contains a sequence of tokens on line 10, cpu_to_le32 (val), which either expands to an invocation of the function-like macro _cpu_to_le32, if KERNEL_ is defined, or denotes the invocation of the C function cpu_to_le32, if_KERNEL_ is not defined. Table 6 shows the three stages of preprocessing the sequence. First, in 6a, the preprocessor expands cpu_to_le32, which makes the conditional explicit but also breaks the nested macro invocation on line 2. Second, in 6b, the preprocessor hoists the conditional around the entire sequence of tokens, which duplicates (val) in each branch and thus restores the invocation on line 2. Third, in 6c, the preprocessor recursively expands _cpu_to_le32 on line 2, which completes preprocessing for the sequence.

TABLE 5

| | |
|---|---|
| 1 | // In include/linux/byteorder/little_endian.h: |
| 2 | #define __cpu_to_le32(x) ((__force __le32)(__u32)(x)) |
| 3 | |
| 4 | #ifdef __KERNEL__ |
| 5 | // Included from include/linux/byteorder/generic.h: |
| 6 | #define cpu_to_le32 __cpu_to_le32 |
| 7 | #endif |
| 8 | |
| 9 | // In drivers/pci/proc.c: |
| 10 | _put_user(cpu_to_le32(val), (__le32 __user *) buf); |

TABLE 6

| | |
|---|---|
| 1 | #ifdef __KERNEL__ |
| 2 | __cpu_to_le32 |
| 3 | #else |
| 4 | cpu_to_le32 |
| 5 | #endif |
| 6 | (val) |
| | (a) After expansion of cpu_to_le32. |
| 1 | #ifdef __KERNEL__ |
| 2 | __cpu_to_le32(val) |
| 3 | #else |
| 4 | cpu_to_le32(val) |
| 5 | #endif |
| | (b) After hoisting the conditional. |
| 1 | #ifdef __KERNEL__ |
| 2 | ((__force __le32)(__u32)(val)) |
| 3 | #else |
| 4 | cpu_to_le32(val) |
| 5 | #endif |
| | (c) After expansion of __cpu_to_le32. |

Token-Pasting and Stringification.

Macros may contain two operators that modify tokens. The infix token-pasting operator ## concatenates two tokens, and the prefix stringification operator # converts a sequence of tokens into a string literal. The preprocessor simply applies these operators, with one complication: the operators' arguments may contain conditionals, either explicitly in source code or implicitly via multiply-defined macros. As for function-like macros, a configuration-preserving preprocessor needs to hoist conditionals around these operators. Table 7 illustrates this for token-pasting: 7a shows the source code; 7b shows the result of expanding all macros, including BITS_PER_LONG from Table 4; and 7c shows the result of hoisting the conditional out of the token-pasting.

TABLE 7

| | |
|---|---|
| 1 | #define uintBPL_t uint (BITS_PER_LONG) |
| 2 | #define uint(x) xuint(x) |
| 3 | #define xuint(x) __le ## x |
| 4 | |
| 5 | uintBPL_t *p = ... ; |
| | (a) The macro definitions and invocation. |
| 1 | __le ## |
| 2 | #ifdef CONFIG_64BIT |
| 3 | 64 |

TABLE 7-continued

| | |
|---|---|
| 4 | #else |
| 5 | 32 |
| 6 | #endif |
| 7 | *p = ... ; |
| | (b) After expanding the macros. |
| 1 | #ifdef CONFIG_64BIT |
| 2 | __le ## 64 |
| 3 | #else |
| 4 | __le ## 32 |
| 5 | #endif |
| 6 | *p = ... ; |
| | (c) After hoisting the conditional. |

File Includes.

To produce complete compilation units, a configuration-preserving preprocessor can recursively resolve file includes (#include). If the directive is nested in a static conditional, the preprocessor can process the header file under the corresponding presence condition. Furthermore, if a guard macro, which is traditionally named FILENAME_H and protects against multiple inclusion, has been undefined, the preprocessor needs to process the same header file again. More interestingly, include directives may contain macros that provide part of the file name. If the macro in such a computed include is multiply-defined, the preprocessor can hoist the implicit conditional out of the directive, just as for function-like macro invocations, token-pasting, and stringification.

Conditionals.

Static conditionals enable multiple configurations, so both configuration-preserving preprocessor and parser can process all branches. The preprocessor converts static conditionals' expressions into presence conditions, and when conditionals are nested within each other, conjoins nested conditionals' presence conditions. As described for macro invocations above, this lets the preprocessor ignore infeasible definitions during expansion of multiply-defined macros.

However, two issues complicate the conversion of conditional expressions into presence conditions. First, a conditional expression may contain arbitrary macros, not just configuration variables. So the preprocessor can expand the macros, which may be multiply-defined. When expanding a multiply-defined macro, the preprocessor can convert the macro's implicit conditional into logical form and hoist it around the conditional expression. For example, when converting the conditional expression

BITS_PER_LONG==32 from kernel/sched.c into a presence condition, the preprocessor can expand the definition of BITS_PER_LONG from Table 4 and hoists it around the conditional expression, to arrive at defined(CONFIG_64BIT)&& 64==32\

||!defined(CONFIG_64BIT)&& 32==32 which makes testing for CONFIG_64BIT explicit with the defined operator and simplifies to !defined(CONFIG_64BIT)

after constant folding.

Second, configuration variables may be non-boolean and conditional expressions may contain arbitrary arithmetic subexpressions, such as $NR\_CPUS<256$ (from arch/x86/include/asm/spinlock.h). Since there is no known efficient algorithm for comparing arbitrary polynomials, such subexpressions prevent the preprocessor from trimming infeasible configurations. Instead, it can treat non-boolean subexpressions as opaque text and preserve their branches' source code ordering, i.e., never omit or combine them and never move other branches across them.

Other Preprocessor Directives.

The C preprocessor supports four additional directives, to issue errors (#error) and warnings (#warning), to instruct compilers (#pragma), and to overwrite line numbers (#line). A configuration-preserving preprocessor simply reports errors and warnings appearing outside static conditionals, and also terminates for such errors. More importantly, it can treat conditional branches containing error directives as infeasible and disables their parsing. Otherwise, it can preserve such directives as token annotations to support automated refactorings.

C Constructs.

The third and final step is parsing. The preprocessor produces entire compilation units, which may contain static conditionals but no other preprocessor operations. The configuration-preserving parser processes all branches of each conditional by forking its internal state into subparsers and merging the subparsers again after the conditional. This way, it produces an AST containing all configurations, with static choice nodes for conditionals.

One significant complication is that static conditionals may still appear between arbitrary tokens, thus violating C syntax, while the AST may only contain nodes representing complete C constructs. To parse C constructs with embedded configurations, the parser may require a subparser per embedded configuration and may also parse tokens shared between configurations several times. For example, the statement on lines 5-10 in Table 2 has two configurations and requires two subparsers. Furthermore, line 10 is parsed twice, once as part of the if-then-else statement and once as a stand-alone expression statement. This way, the parser hoists static conditionals out of C constructs in a similar way compared to the preprocessor hoisting static conditionals out of preprocessor operations.

This is acceptable for most declarations, statements, and expressions, which have a small number of terminals and non-terminals and thus can contain only a limited number of configurations. However, if a C construct contains repeated non-terminals, this can lead to an exponential blow-up of configurations and therefore subparsers. For example, the array initializer in Table 8 has $2^{18}$ unique configurations. Using a subparser for each configuration is clearly infeasible and avoiding this requires careful optimization of the parsing algorithm.

TABLE 8

| | |
|---|---|
| 1 | static int (*check_part[ ])(struct parsed_partitions *) = { |
| 2 | #ifdef CONFIG_ACORN_PARTITION_ICS |
| 3 | adfspart_check_ICS. |
| 4 | #endif |
| 5 | #ifdef CONFIG_ACORN_PARTITION_POWERTEC |
| 6 | adfspart_check_POWERTEC. |
| 7 | #endif |
| 8 | #ifdef CONFIG_ACORN_PARTITION_EESOX |
| 9 | adfspart_check_EESOX. |
| 10 | #endif |
| 11 | // 15 more, similar initializers |
| 12 | NULL |
| 13 | }; |

Typedef Names.

A final complication results from the fact that C syntax is context-sensitive. Depending on context, names can either be typedef names, i.e., type aliases, or they can be object, function, and enum constant names. Furthermore, the same code snippet can have fundamentally different semantics, depending on names. For example, $T*p;$ is either a declaration of p as a pointer to type T or an expression statement that multiplies the variables T and p, depending on whether T is a typedef name. C parsers usually employ a symbol table to disambiguate names. In the presence of conditionals, however, a name may be both. Consequently, a configuration-preserving parser can maintain configuration-dependent symbol table entries and fork subparsers when encountering an implicit conditional due to an ambiguously defined name.

Implementations of a configuration-preserving preprocessor and corresponding configuration-preserving parser include features as described above. Two features, however, require further elaboration: the hoisting of static conditionals around preprocessor operations and the conversion of conditional expressions into presence conditions.

Hoisting Static Conditionals.

Preprocessor directives as well as function-like macro invocations, token-pasting, and stringification may only contain ordinary language tokens. Consequently, they are ill-defined in the presence of implicit or explicit embedded static conditionals. To perform these preprocessor operations, various implementations of a configuration-preserving preprocessor can hoist conditionals, so that only ordinary tokens appear in the branches of the innermost conditionals.

TABLE 9

| | |
|---|---|
| 1: | procedure HOIST(c, τ) |
| 2: | ▷ Initialize a new conditional with an empty branch. |
| 3: | C ← [ (c, •) ] |
| 4: | for all a ∈ τ do |
| 5: | if a is a language token then |
| 6: | ▷ Append a to all branches in C. |
| 7: | C ← [ (c$_i$,τ$_i$a) | (c$_i$, τ$_i$) ∈ C ] |
| 8: | else▷ a is a conditional, |
| 9: | ▷ Recursively hoist conditionals in each branch. |
| 10: | B ← [b | b ∈ HOIST(c$_j$, τ$_j$) and (c$_j$, τ$_j$) ∈ a ] |
| 11: | ▷ Combine with already hoisted conditionals. |
| 11 | C ← C × B |
| 13: | end if |
| 14: | end for |
| 15: | return C |
| 16: | end procedure |

Table 9 illustrates one example of a HOIST algorithm. It takes a presence condition c and a list of ordinary tokens and entire conditionals τ under the presence condition. Each static conditional C, in turn, is treated as a list of branches:

$C := [(c_1, \tau_1), \ldots, (c_n, \tau_n)]$ with each branch having a presence condition c, and a list of tokens and nested conditionals $\tau_1$. Line 3 initializes the result C with an empty conditional branch. Lines 4-14 iterate over the tokens and conditionals in τ, updating C as necessary. And line 15 returns the result C. Lines 5-7 of the loop handle ordinary tokens, which are present in all embedded configurations and are appended to all branches in C, as illustrated for (val) in Table 6b and for_le## in Table 7c. Lines 8-13 of the loop handle static conditionals by recursively hoisting any nested conditionals in line 10 and then combining the result B with C in line 12. The cross product for conditionals in line 12 is defined as:

$C \times B := [(c_i \wedge c_j, \tau_i \tau_j) | (c_i, \tau_i) \in C \text{ and } (c_j, \tau_j) \in B]$ and generalizes line 7 by combining every branch in C with every branch in B.

In one implementation, a configuration-preserving preprocessor uses HOIST for all preprocessor operations that may contain conditionals except for function-like macro invocations. The problem with the latter is that, to call HOIST, the preprocessor needs to know which tokens and conditionals belong to an operation. But different conditional branches of a function-like macro invocation may contain different macro names and numbers of arguments, and even additional, unrelated tokens. Consequently, various implementations of the configuration-preserving preprocessor can use a version of HOIST for function-like macro invocations that interleaves parsing with hoisting. For each conditional branch, it tracks parentheses and commas, which change the parsing state of the invocation. Once all variations of the invocation have been recognized across all conditional branches, each invocation is separately expanded. If a variation contains an object-like or undefined macro, the argument list is left in place, as illustrated in Table 6c, line 4.

One implementation tracks all configurations of an invocation by maintaining a list of pairs, where each pair is an invocation parsing state with its presence condition. The invocation state can contain an argument count, parenthesis depth, a parsing result, and whatever state is needed for parsing. To determine the presence conditions of all configurations, an implementation works like this. Starting with one invocation parsing state, it reads tokens one-by-one. Each token is used to update the parsing state of all configurations of the invocation. Before updating one configuration's parsing state, the procedure checks whether the token's presence condition and the configuration's presence condition are different (but not mutually exclusive). If they are different, the parsing state is duplicated, and the two duplicated presence conditions are (1) the original configuration's presence condition conjoined with the token's presence condition and (2) the original configuration's presence condition conjoined with the negation of the token's presence condition. This process is repeated with tokens from the input until all configurations of the invocation have finished parsing or found a parsing error. To hoist the conditional around the invocation, an implementation can create a new conditional. Each configuration is given one branch in the new conditional. Each branch's presence condition is one configuration's, and the branch contains the tokens that appear in that configuration (i.e., the token's whose presence condition is not mutually exclusive with the configuration's). Once conditionals have been hoisted around the invocation, the preprocessor can process the conditional as usual, invoking each branch's function-like macro.

Converting Conditional Expressions.

To reason about presence conditions, conditional expressions can be converted into binary functions. In various implementations conditional expressions can be converted into Binary Decision Diagrams (BDDs), which are an efficient, symbolic representation of boolean functions. BDDs include support for boolean constants, boolean variables, as well as negation, conjunction, and disjunction. On top of that, BDDs are canonical: Two boolean functions are the same if and only if their BDD representations are the same. This makes it not only possible to directly combine BDDs, e.g., when tracking the presence conditions of nested or hoisted conditionals, but also to easily compare two BDDs for equality, e.g., when testing for an infeasible configuration by evaluating $c_1 \wedge c_2 = $false.

Before converting a conditional expression into a BDD, the configuration-preserving preprocessor can expand any macros outside invocations of the defined operator, can hoist multiply-defined macros around their sub-expressions, and can perform constant folding. The resulting conditional expression uses negations, conjunctions, and disjunctions to combine four types of sub-expressions: constants, free macros, arithmetic expressions, and defined invocations. The configuration-preserving preprocessor can convert each of these sub-expressions into a BDD as follows and then combines the resulting BDDs with the necessary logical operations:
1. A constant translates to false if zero and to true otherwise.
2. A free macro translates to a BDD variable.
3. An arithmetic subexpression also translates to a BDD variable.
4. defined(M) translates into the disjunction of presence conditions, under which M is defined. However, if M is free:
   a. If M is a guard macro, defined(M) translates to false.
   b. Otherwise, defined(M) translates to a BDD variable.

Just like gcc, Case 4a treats M as a guard macro, if a header file starts with a conditional directive that tests !defined(M) and is followed by #define M, and the matching #endif ends the file. To ensure that repeated occurrences of the same free macro, arithmetic expression, or defined(M) for free M translate to the same BDD variable, the configuration-preserving preprocessor can maintain a mapping between these expressions and their BDD variables. In the case of arithmetic expressions, it normalizes the text by removing whitespace and comments.

Binary functions, other than BDD, can be used in other implementations. For example, an automated SAT solver or an automated SMT solver can be used to encode binary functions.

The Configuration-Preserving Parser.

In various implementations, the invention can include a configuration-preserving fork-merge LR (FMLR) parser that builds on LR parsing, a bottom-up parsing technique. To recognize the input, LR parsers can maintain an explicit parser stack, which contains terminals, i.e., tokens, and non-terminals. On each step, LR parsers can perform one of four actions: (1) shift to copy a token from the input onto the stack and increment the parser's position in the input; (2) reduce to replace one or more top-most stack elements with a non-terminal; (3) accept to successfully complete parsing; and (4) reject to terminate parsing with an error. The choice of action depends on both the next token in the input and the parser stack. To ensure efficient operation, LR parsers use a deterministic finite control and store the state of the control with each stack frame.

Compared to top-down parsing techniques, such as LL and PEG, LR parsers are an attractive foundation for configuration-preserving parsing for three reasons. First, LR parsers make the parsing state explicit, in form of the parser stack. Consequently, it is easy to fork the parser state on a static conditional, e.g., by representing the stack as a singly-linked list and by creating new stack frames that point to the shared remainder. Second, LR parsers are relatively straight-forward to build, since most of the complexity lies in generating the parsing tables, which determine control transitions and actions. Various implementations of a configuration-preserving parser can use tables produced by an existing parser generator. Third, LR parsers support left-recursion in addition to right-recursion, which can be helpful for writing programming language grammars.

Fork-Merge LR Parsing.

Table 10 illustrates one example of a FMLR parsing algorithm. It uses a queue Q of LR subparsers p. Each subparser p:=(c, a, s) has a presence condition c, a next token or conditional a, which is also called head, and an LR parser stack s. Each subparser recognizes a distinct configuration, i.e., the different presence conditions p.c are mutually exclusive, and all subparsers together recognize all configurations, i.e., the disjunction of all their presence conditions is true. Q is a priority queue, ordered by the position of the head p.a in the input. This ensures that subparsers merge at the earliest opportunity, as no subparser can outrun the other subparsers.

Line 2 initializes the queue Q with the subparser for the initial token or conditional $a_0$, and lines 3-14 step individual subparsers until the queue is empty, i.e., all subparsers have accepted or rejected. On each iteration, line 4 pulls the earliest subparser p from the queue. Line 5 computes the token follow-set for p.c and p.a, which contains pairs (c,a) of ordinary language tokens a and their presence conditions c. The follow-set computation is detailed below. Intuitively, it captures the actual variability of source code and includes the first language token on each path through static conditionals from the current input position. If the follow-set contains a single element, e.g., p.a is an ordinary token and T={(p.c,p.a)}, lines 6-8 perform an LR action on the only element T(1) and the subparser p. Unless the LR action is accept or reject, line 8 also reschedules the subparser. Otherwise, the follow-set contains more than one element, e.g., p.a is a conditional. Since each subparser can only perform one LR action after the other, lines 9-12 fork a subparser for each presence condition and token (c,a)∈T and then reschedule the subparsers. Finally, line 13 tries to merge subparsers again.

TABLE 10

| | |
|---|---|
| 1: | procedure PARSE($a_0$) |
| 2: | Q.init((true, $a_0$, $s_0$)) ▷ The initial subparser for $a_0$. |
| 3: | while Q ≠ ∅ do |
| 4: |   p ← Q.pull( ) ▷ Step the next subparser. |
| 5; |   T ← FOLLOW(p.c, p.a) |
| 6: |   if \|T\| = 1 then |
| 7: |     ▷ Do an LR action and reschedule the subparser. |
| 8: |     Q.insert(LR(T(1), p)) |
| 9: |   else ▷ The follow-set contains several tokens. |
| 10: |     ▷ Fork subparsers and reschedule them. |
| 11: |     Q.insertAll(FORK(T, p)) |
| 12: |   end if |
| 13: |   Q ← MERGE(Q) |
| 14: | end while |
| 15: | end procedure |

The Token Follow-Set.

A critical challenge for configuration-preserving parsing is which subparsers to create. The naive strategy forks a subparser for every branch of every static conditional. But conditionals may have empty branches and even omit branches, like the implicit else branch shown in Tables 1 and 2. Furthermore, they may be directly nested within conditional branches, and they may directly follow other conditionals. Consequently, the naive strategy forks a great many unnecessary subparsers and is intractable for complex C programs, such as Linux. Instead, FMLR relies on the token follow-set to capture the source code's actual variability and, thus, limits the number of forked subparsers.

Table 11 illustrates one example of a FOLLOW algorithm. It takes a presence condition c and a token or conditional a, and it returns the follow-set T for a, which contains pairs $(c_i, a_i)$ of ordinary tokens $a_i$ and their presence conditions $c_i$. By construction, each token $a_i$ appears exactly once in T; consequently, the follow-set is ordered by the tokens' positions in the input. Line 2 initializes T to the empty set. Lines 3-24 define the nested procedure FIRST. It scans well-nested conditionals and adds the first ordinary token and presence condition for each configuration to T. It then returns the presence condition of any remaining configuration, i.e., conditional branches that are empty or implicit and thus do not contain ordinary tokens. Lines 25-29 repeatedly call FIRST until all configurations have been covered, i.e., the remaining configuration is false. Line 28 moves on to the next token or conditional, while also stepping out of conditionals. In other words, if the token or conditional a is the last element in the branch of a conditional, which, in turn, may be the last element in the branch of another conditional (and so on), line 28 updates a with the first element after the conditionals.

TABLE 11

```
 1:    procedure FOLLOW(c, a)
 2:        T ← ∅ ▷ Initialize the follow-set.
 3:        procedure FIRST(c, a)
 4:            loop
 5:                if a is a language token then
 6:                    T ← T ∪ {(c, a)}
 7:                    return false
 8:                else ▷ a is a conditional.
 9:                    c_r ← false ▷ Initialize remaining condition.
10:                    for all (c_i, τ_i) ∈ a do
11:                        if τ_i = • then
12:                            c_r ← c_r ∨ c ∧ c_i
13:                        else
14:                            c_r ← c_r ∨ FIRST(c ∧ c_i, τ_i(1))
15:                        end if
16:                    end for
17:                    if c_r = false or a is last element in branch then
18:                        return c_r
19:                    end if
20:                    c ← c_r
21:                    a ← next token or conditional after a
22:                end if
23:            end loop
24:        end procedure
25:        loop
26:            c ← FIRST(c, a)
27:            if c = false then return T end if ▷ Done.
28:            a ← next token or conditional after a
29:        end loop
30:    end procedure
```

FIRST does the brunt of the work. It takes a token or conditional a and presence condition c. Lines 4-23 then iterate over the elements of a conditional branch or at a compilation unit's top-level, starting with a. Lines 5-7 handle ordinary language tokens. Line 6 adds the token and presence condition to the follow-set T Line 7 terminates the loop by returning false, indicating no remaining configuration. Lines 8-22 handle conditionals. Line 9 initializes the remaining configuration $c_r$ to false. Lines 10-16 then iterate over the branches of the conditional a, including any implicit branch. If a branch is empty, line 12 adds the conjunction of its presence condition $c_i$ and the overall presence condition c to the remaining configuration $c_r$. Otherwise, line 14 recurses over the branch, starting with the first token or conditional $τ_i(1)$, and adds the result to the remaining configuration $c_r$. If, after iterating over the branches of the conditional, the remaining configuration is false or there are no more tokens or conditionals to process, lines 17-19 terminate FIRST's main loop by returning $c_r$. Finally, lines 20-21 set up the next iteration of the loop by updating c with the remaining configuration and a with the next token or conditional.

Forking and Merging.

Table 12a shows example definitions of FORK and MERGE. FORK creates new subparsers from a token follow-set T to replace a subparser p. Each new subparser has a different presence condition c and token a from the follow-set T but the same LR parser stack p.s. Consequently, it recognizes a more specific configuration than the original subparser p. MERGE has the opposite effect. It takes the priority queue Q and combines any subparsers p∈Q that are on the same token and have the same LR parser stack. Such subparsers are redundant: they will necessarily perform the same parsing actions for the rest of the input, since FMLR, like LR, is deterministic. Each merged subparser replaces the original subparsers; its presence condition is the disjunction of the original subparsers' presence conditions. Consequently, it recognizes a more general configuration than any of the original subparsers. MERGE is similar to GLR's local ambiguity packing, which also combines equivalent subparsers, except that FMLR subparsers have presence conditions.

TABLE 12

FORK(T, p) := {(c, a, p.s) | (c, a) ∈ T}
MERGE(Q) := {(⋁ p.c, a, s) | a = p.a and s = p.s ∀ p ∈ Q}
(a) Basic forking and merging.

FORK(T, p) := {(H, p.s) | H ∈ LAZY(T, p) ∪ SHARED(T, p)}
LAZY(T, p) := {∪{(c, a)} | action[a, p.s] = 'shift' ∀(c, a) ∈ T}
SHARED(T, p) :=
    {∪{(c, a)} | action[a, p.s] = 'reduce n' ∀(c, a) ∈ T}
(b) Optimized forking.

Optimizations.

In addition to the token follow-set, FMLR relies on three more optimizations to contain the state explosion caused by static conditionals: early reduces, lazy shifts, and shared reduces. Early reduces provide a tie-breaker for the priority queue. When subparsers have the same head a, they favor subparsers that will reduce over subparsers that will shift. Since reduces, unlike shifts, do not change a subparser's head, early reduces prevent subparsers from outrunning each other and create more opportunities for merging subparsers.

While early reduces seek to increase merge opportunities, lazy shifts and shared reduces seek to decrease the number and work of forked subparsers, respectively. First, lazy shifts delay the forking of subparsers that will shift. They are based on the observation that a sequence of static conditionals with empty or implicit branches, such as the array initializer in Table 8, often results in a follow-set, whose tokens all require a shift as the next LR action. However, since FMLR steps subparsers by position of the head, the subparser for the first such token performs its shift (plus other LR actions) and can merge again before the subparser for the second such token can even perform its shift. Consequently, it is wasteful to eagerly fork the subparsers. Second, shared reduces reduce a single stack for several heads at the same time. They are based on the observation that conditionals often result in a follow-set, whose tokens all require a reduce to the same non-terminal; e.g., both tokens in the follow-set of the conditional in Table 2 reduce the declaration on line 3. Consequently, it is wasteful to first fork the subparsers and then reduce their stacks in the same way.

Table 12b formally defines examples of both lazy shifts and shared reduces. Both optimizations result in multi-headed subparsers p:=(H, s), which have more than one head and presence condition $$H := \{(c_1, a_1), \ldots, (c_n, a_n)\}$$

Just as for the follow-set, each token $a_1$ appears exactly once in H, and the set is ordered by the tokens' positions in the input. The FMLR algorithm illustrated in Table 10 generalizes to multi-headed subparsers as follows. It prioritizes a multi-headed subparser by its earliest head $a_1$. Next, by definition of optimized forking, the follow-set of a multi-headed subparser (H,s) is H. However, the optimized version of the FMLR algorithm always performs an LR operation on a multi-headed subparser, i.e., treats it as if the follow-set contains a single ordinary token. If the multi-headed subparser will shift, it forks off a single-headed subparser p' for the earliest head, shifts p', and then reschedules both subparsers. If the multi-headed subparser will reduce, it reduces p and immediately recalculates FORK(H,p), since the next LR action may not be the same reduce for all heads anymore. Finally, it merges multi-headed subparsers p if they have the same heads $\{(\_,a_1), \ldots (\_,a_n)\}$=p.H and the same LR parser stacks s=p.s; it computes the merged parser's presence conditions as the disjunction of the original subparser's corresponding presence conditions $c_i = \vee\, p \cdot H(i) \cdot c$.

To further illustrate FMLR, an example of using FMLR on the array initializer shown in Table 8 is provided. For simplicity, NULL is treated as a token and its usual expansion to ((void*)0) is ignored. For concision, subparser and set symbols are subscripted with their current line numbers in Table 8. $b_n$ is used to denote the boolean variable representing the conditional expression on line n, e.g., $b_2$~defined(CONFIG_ACORN_PARTITION_ICS)

Finally, one iteration through FMLR's main loop in Table 8 is referred to as a step.

Since Table 8 line 1 contains only ordinary tokens, FMLR behaves like an LR parser, stepping through the tokens with a single subparser $p_1$. Upon reaching line 2, FMLR computes FOLLOW for the conditional on lines 2-4. To this end, FIRST iterates over the conditionals and NULL token in the initializer list by updating a in Table 11, line 21. On each iteration besides the last, FIRST also recurses over the branches of a conditional, including the implicit else branch. As a result, it updates the remaining configuration in Table 11, line 12 with a conjunction of negated conditional expressions, yielding the follow-set:

$T_2 = \{(b_2,\text{adfspart\_check\_ICS}), (\neg b_2 \wedge b_5, \text{adfs-part\_check\_POWERTEC}), (\neg b_2 \wedge \neg b_5 \wedge \neg b_8 \wedge \ldots, \text{NULL})\}$ Since all tokens in $T_2$ reduce the empty input to the InitializerList nonterminal, shared reduces turns $p_2$ into a multi-headed subparser with $H_2 = T_2$. FMLR then steps $p_3$. It reduces the subparser, which does not change the heads, i.e., $H_3 = T_3$, but modifies the stack to:

$p_3 \cdot s = \ldots \{\text{InitializerList}$

It then calculates FORK($H_3, T_3$); since all tokens in $H_3$ now shift, lazy shifts produces the same multi-headed subparser. FMLR steps $p_3$ again. It forks off a single-headed subparser $p'_3$ and shifts the identifier token on line 3 onto its stack. Next, FMLR steps $p'_3$. It shifts the comma token onto the stack, which yields:

$p'_3 \cdot s = \ldots \{\text{InitializerList adfspart\_check\_ICS},$ and updates the head $p'_3 \cdot a$ to the conditional on lines 5-7. FMLR steps $p'_3$ again, computing the subparser's follow-set as:

$T'_5 = \{(b_2 \wedge b_5, \text{adfspart\_check\_POWERTEC}), \ldots, (b_2 \wedge \neg b_5 \wedge \neg b_8 \wedge \ldots, \text{NULL})\}$ Since all tokens in $T'_5$ reduce the top three stack elements to an InitializerList, shared reduces turns $p'_5$ into a multi-headed subparser with $H_5 = T_5$. At this point, both $p_6$ and $p'_6$ are multi-headed subparsers with the same heads, though their stacks differ. Due to early reduces, FMLR steps $p'_6$. It reduces the stack, which yields the same stack as that of $p_6$, and calculates FORK, which does not change $p'_6$ due to lazy shifts. It then merges the two multi-headed subparsers, which disjoins $b_2$ with $\neg b_2$ for all presence conditions and thus eliminates $b_2$ from $H_6$. FMLR then repeats the process of forking, shifting, reducing, and merging for the remaining 17 conditionals until a single-headed subparser p completes the array initializer on lines 12-13. That way, FMLR parses $2^{18}$ distinct configurations with only 2 subparsers.

Building Abstract Syntax Trees.

To simplify AST construction, implementations can includes an annotation facility that eliminates explicit semantic actions in most cases. Developers can simply add special comments next to productions. An AST tool can then extract these comments and generate the corresponding parser plug-in code, which is invoked when reducing a subparser's stack. By default, implementations of the invention can create an AST node that is an instance of a generic node class, is named after the production, and has the semantic values of all terminals and non-terminals as children. Four annotations override this default. First, layout omits the production's value from the AST. It is used for punctuation. Second, passthrough reuses a child's semantic value, if it is the only child in an alternative. It is particularly useful for expressions, whose productions tend to be deeply nested for precedence (17 levels for C). Third, list encodes the semantic values of a recursive production as a linear list. It is necessary because LR grammars typically represent repetitions as left-recursive productions. Fourth, action executes arbitrary program code instead of automatically generating an AST node.

A fifth annotation, complete, determines which productions are complete syntactic units. Implementations can merge only subparsers with the same, complete non-terminal on top of their stacks; while merging, they can combine the subparsers' semantic values with a static choice node. The selection of complete syntactic units requires care. Treating too many productions as complete forces downstream tools to handle static choice nodes in too many different language constructs. Treating too few productions as complete may result in an exponential subparser number in the presence of embedded configurations, e.g., the array initializer in Table 8. Implementations of the invention's C grammar try to strike a balance by treating not only declarations, definitions, statements, and expressions as complete syntactic units, but also members in commonly configured lists, including struct and union members, function parameters, and struct, union, and array initializers.

Managing Parser Context.

In addition, implementations can include a context management plug-in that enables the recognition of context-sensitive languages, including C, without modifying the FMLR parser. The plug-in can have four callbacks: (1) reclassify modifies the token follow-set by changing or adding tokens. It is called after computing the follow-set, i.e., line 5 in Table 10. (2) forkContext creates a new context and is called during forking. (3) mayMerge determines whether two contexts allow merging and is called while merging subparsers. (4) mergeContexts actually combines two contexts and is also called while merging.

An example plug-in for parsing C can work as follows. Its context is a symbol table, which tracks which names denote values or types under which presence conditions and in which C language scopes. Productions that declare names and enter/exit C scopes update the symbol table through helper productions that are empty but have semantic actions. reclassify checks the name of each identifier. In one implementation, these are the only token generated for names. If the name denotes a type in the current scope, reclassify replaces the identifier with a typedef name. If the name is ambiguously defined under the current presence condition, it instead adds the typedef name to the follow-set. This causes the FMLR parser to fork an extra subparser on such names, even though there is no explicit conditional. forkContext duplicates the current symbol table scope. mayMerge allows merging only at the same scope nesting level. Finally, mergeContexts combines any symbol table scopes not already shared between the two contexts.

Error Handling.

Some branches of static conditionals may contain malformed preprocessor operations or malformed language code. Unlike a regular preprocessor, the configuration-preserving preprocessor does not halt after encountering a malformed preprocessor operation. Instead, it passes a special token to the parser that indicates an erroneous conditional branch. The configuration-preserving parser, in turn, does not parse such erroneous conditional branches but instead adds a special error node to the AST. The referring static choice node identifies the conditional branch's presence condition, while the error node identifies the cause and location of the error. Similarly, if the configuration-preserving parser encounters malformed language code, it stops parsing of the conditional branch and instead creates an error node in the AST. Again, the referring static choice node identifies the branch's presence condition, while the error node identifies the cause and location of the error.

EXAMPLES

The described configuration-preserving preprocessor and parser can be understood more readily by reference to the following example, which are provided by way of illustration and are not intended to be limiting in any way.

Preprocessor Usage and Interactions.

Table 13 provides a developer's view of preprocessor usage in the x86 Linux kernel. The data was collected by running cloc, grep, and we on individual C and header files. Table 13a compares the number of preprocessor directives to lines of code (LoC), excluding comments and empty lines. Even this simple analysis demonstrates extensive preprocessor usage: almost 10% of all LoC are preprocessor directives. Yet, when looking at C files, preprocessor usage is not nearly as evident for two reasons. First, macro invocations look like C identifiers and C function calls; they may also be nested in other macros. Consequently, they are not captured by this analysis. Second, C programs usually rely on headers for common definitions, i.e., as a poor man's module system. The data corroborates this. 66% of all directives and 84% of macro definitions are in header files. Furthermore, 16% of include directives are in header files, resulting in long chains of dependencies. Finally, some headers are directly included in thousands of C files (and preprocessed for each one). Table 2b shows the top five most frequently included headers; module.h alone is included in nearly half of all C files.

TABLE 13

(a) Number of directives compared to lines of code (LoC).

|  | Total | C Files | Headers |
| --- | --- | --- | --- |
| LoC | 5,632,708 | 85% | 15% |
| All Directives | 531,528 | 34% | 66% |
| #define | 364,326 | 16% | 84% |
| #if, #ifdef, #ifndef | 38,297 | 58% | 42% |
| #include | 87,280 | 84% | 16% |

(b) The top five most frequently included headers.

| Header Name | C Files That Include Header |
| --- | --- |
| include/linux/module.h | 3,741 (49%) |
| include/linux/init.h | 2,841 (37%) |
| include/linux/kernel.h | 2,567 (33%) |
| include/linux/slab.h | 1,800 (23%) |
| include/linux/delay.h | 1,505 (20%) |

Table 14 provides a tool's view of preprocessor usage in the x86 Linux kernel. The data was collected by instrumenting an implementation of the invention and applying it on compilation units, i.e., C files plus the closure of included headers. It captures information not available in the simple counts of Table 13, including macro invocations. Table 14 loosely follows the organization of Table 3. Each row shows a preprocessor or C language construct. The first column names the construct, the second column shows its usage, and the third and fourth columns show its interactions. Each entry is the distribution in three percentiles, "50th·90th·100th," across compilation units. Table 14 confirms that preprocessor usage is extensive. It also confirms that most interactions identified above occur in real-world C code.

TABLE 14

| Language Construct | Total | Interaction with Conditionals | Other Interactions |
| --- | --- | --- | --- |
| Macro Definitions | 34k · 45k · 122k | Contained in 34k · 45k · 122k | Redefinitions 23k · 33k · 111k |
| Macro Invocations | 98k · 140k · 381k | Trimmed 16k · 21k · 70k<br>Hoisted 154 · 292 · 876 | Nested invocations 64k · 97k · 258k<br>Built-in macros 135 |
| Token-Pasting | 4k · 6k · 22k | Hoisted 0 · 0 · 180 |  |
| Stringification | 6k · 8k · 23k | Hoisted 361 · 589 · 6,082 |  |
| File Includes | 1,608 · 2,160 · 5,939 | Hoisted 33 · 55 · 165 | Computed includes 34 · 56 · 168<br>Reincluded headers 1,184 · 1,744 · 5,488 |
| Static Conditionals | 8k · 10k · 29k | Hoisted 331 · 437 · 1,258<br>Max. depth 28 · 33 · 40 | With non-boolean 509 · 713 · 1,975<br>expressions |
| Error Directives | 42 · 57 · 168 |  |  |
| C Declarations & Statements | 34k · 49k · 127k | Containing X · X · X |  |
| Typedef Names | 734 · 1,010 · 2,554 | Ambiguously 0 · 0 · 0<br>defined names |  |

The vast majority of measured preprocessor interactions involve macros. First, almost all macro definitions are contained in static conditionals, i.e., any difference is hidden by rounding to the nearest thousand. This is due to most definitions occurring in header files and most header files, in turn, containing a single static conditional that protects against multiple inclusion. Second, over 60% of macro invocations appear from within other macros; e.g., the median for total macro invocations is 98k, while the median for nested invocations is 64k. This makes it especially difficult to fully analyze macro invocations without running the preprocessor, e.g., by inspecting source code. While not nearly as frequent as interactions involving macros, static conditionals do appear within function-like macro invocations, token-pasting and stringification operators, file includes, as well as conditional expressions. Consequently, a configuration-preserving preprocessor must hoist such conditionals. Similarly, non-boolean expressions do appear in conditionals and the preprocessor must preserve them. However, two exceptions are notable. Computed includes are very rare and ambiguously-defined names do not occur at all, likely because both make it very hard to reason about source code.

Subparser Counts.

According to Table 14, most compilation units contain thousands of static conditionals. This raises the question of whether recognizing C code across conditionals is even feasible. Two factors determine feasibility: (1) the breadth of conditionals, which forces the forking of subparsers, and (2) the incidence of partial C constructs in conditionals, which prevents the merging of subparsers. The number of subparsers per iteration of FMLR's main loop in Table 10, lines 3-14 precisely captures the combined effect of these two factors.

Figure 2:
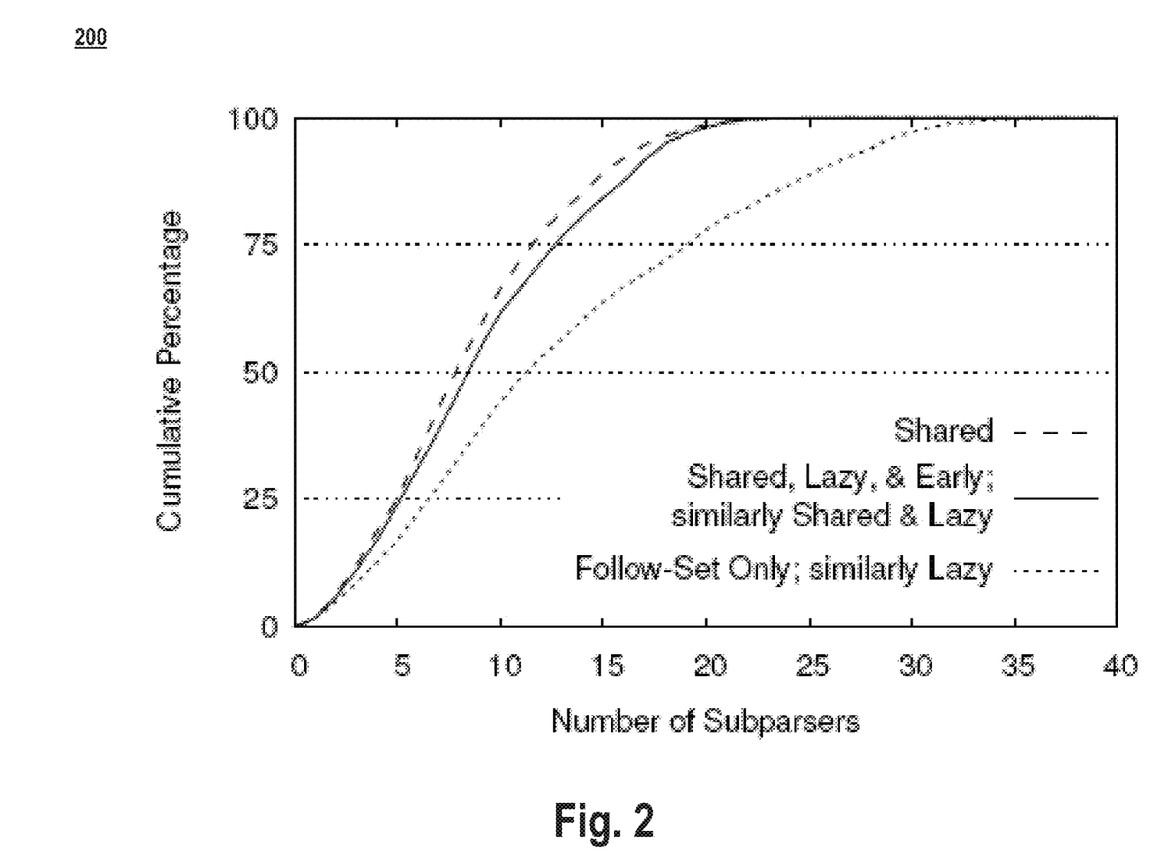
FIG. 2 shows the cumulative distribution of subparser counts per FMLR iteration for the x86 Linux kernel under different optimization levels in accordance with various illustrative implementations.

Table 15 and FIG. 2 shows the cumulative distribution of subparser counts per FMLR iteration for the x86 Linux kernel under different optimization levels: Table 15 identifies the maxima and FIG. 2 characterizes the overall shape. Table 15 also includes MAPR, a tool that includes a C preprocessor and parser, as a baseline. Table 15 demonstrates that MAPR is intractable for Linux, triggering a kill-switch at 16,000 subparsers for 98% of all compilation units. In contrast, the token follow-set alone makes FMLR feasible for the entire x86 Linux kernel. The lazy shifts, shared reduces, and early reduces optimizations further decrease subparser counts, by up to a factor 5.8. They also help keep the AST smaller: fewer forked subparsers means fewer static choice nodes in the tree, and earlier merging means more tree fragments outside static choice nodes, i.e., shared between configurations.

TABLE 15

| Optimization Level | Subparsers | |
|---|---|---|
| | 99th % | Max. |
| Shared, Lazy, & Early | 20 | 39 |
| Shared & Lazy | 21 | 39 |
| Shared | 20 | 77 |
| Lazy | X | X |
| Follow-Set FMLR | 32 | 227 |

MAPR & Largest First >16,000 on 98% of comp. units
MAPR >16,000 on 98% of comp. units Performance.

In this example, the tested implementation ran on the Java virtual machine. TypeChef, a variability aware preprocessor and parser, was also run on the Java virtual machine, which enables a direct performance comparison. All of the tested implementation and TypeChef's preprocessor are written in Java, whereas TypeChef's parser is written in Scala. Running either tool on x86 Linux requires some preparation. (1) both tools were configured with gcc's built-in macros. The tested implementation automated this through its build system; TypeChef's distribution includes manually generated files for different compilers and versions. (2) Both tools required a list of C files identifying the kernel's compilation units. The list of 7,665 C files distributed with TypeChef was used. (3) The tested implementation was configured with four definitions of non-boolean macros, which were discovered by comparing the result of running gcc's preprocessor, i.e., gcc-E, under the allyesconfig configuration on the 7,665 C files with the result of running it on the output of the tested implementation's configuration-preserving preprocessor for the same files. With those four definitions in place, the results were identical modulo whitespace. (4) TypeChef needs to be configured with over 300 additional macro definitions. It also treats macros that are not explicitly marked as configuration variables, i.e., have the CONFIG_prefix, as undefined instead of free.

Two different configurations were run based upon the preparation steps mentioned above. In one test, only the first three preparation steps were done. This was considered the unconstrained kernel. In another test, all four preparation steps were done, and this was called the constrained kernel. At the time of this example, TypeChef ran only on the constrained kernel, and only on version 2.6.33.3. To ensure that results are comparable, the examples and experiments also used version 2.6.33.3 of Linux. At the same time, the tested implementation ran on both constrained and unconstrained kernels. In fact, the data presented in Table 3 for preprocessor usage and in Table 15 for subparser counts was collected by running the tested implementation on the unconstrained kernel. The constrained kernel has less variability: its $99^{th}$ and $100^{th}$ percentile subparser counts are 12 and 32, as opposed to 21 and 39 for the unconstrained kernel. The tested implantation was also ran on other versions of Linux; we validated our tool on the latest stable version, 3.2.9.

Figure 3:
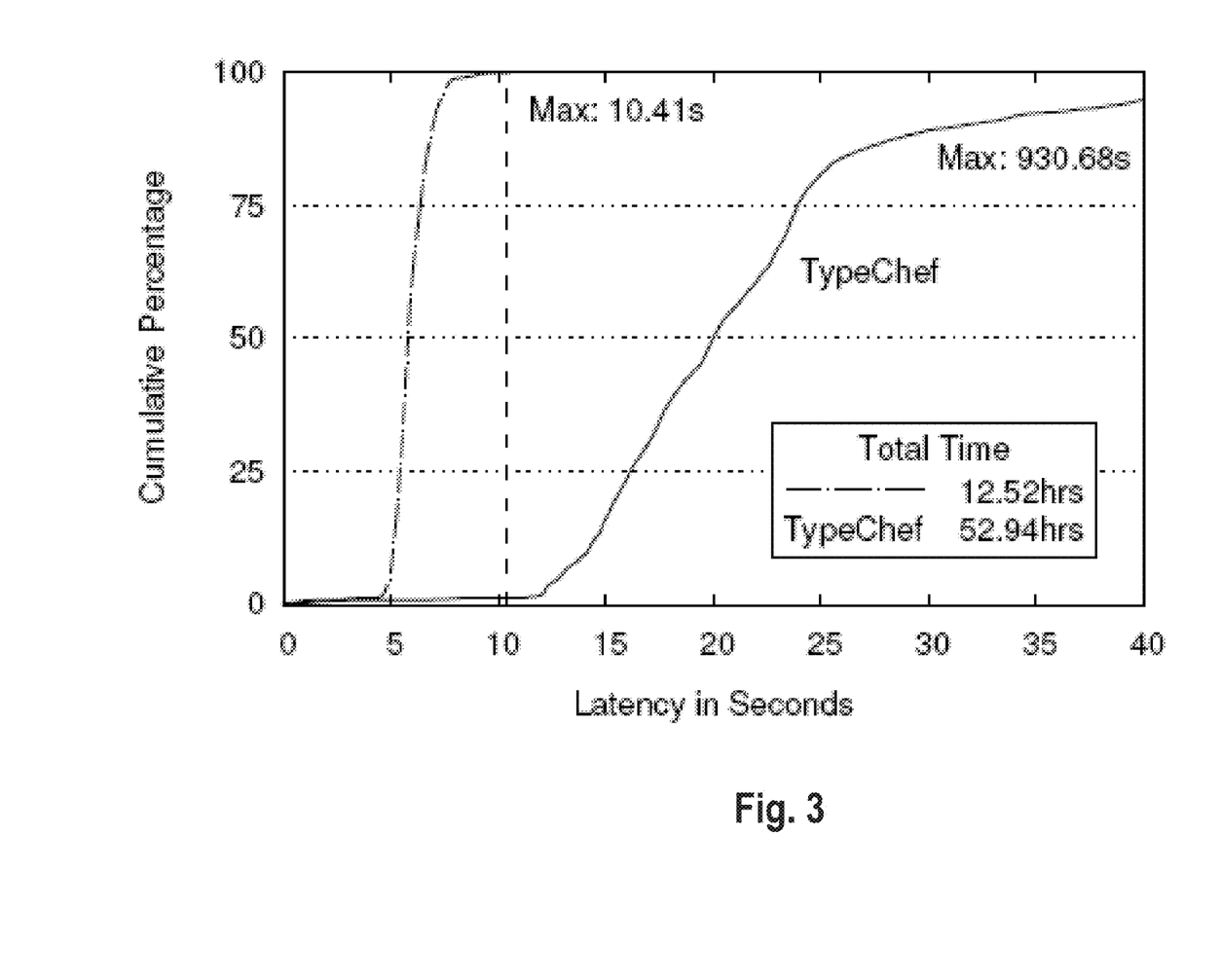
FIG. 3 shows the cumulative latency distribution across compilation units of the constrained kernel of one illustrative implementation and TypeChef when ran on an off-the-shelf PC.

FIG. 3 shows the cumulative latency distribution across compilation units of the constrained kernel of the tested implementation and TypeChef when ran on an off-the-shelf PC. For each tool, it also identifies the maximum latency for a compilation unit and the total latency for the kernel. The latter number should be treated as a convenient summary, but no more: workload and tools easily parallelize across cores and machines. When considering the 50th and $80^{th}$ percentiles, both tools perform reasonably well. While the tested implementation was between 3.4 to 3.8 times faster than TypeChef, both curves show a mostly linear increase, which is consistent with a normal distribution. However, the "knee" in TypeChef's curve at about 25 seconds and the subsequent long tail, reaching over 15 minutes, indicates a serious scalability bottleneck.

Figure 4:
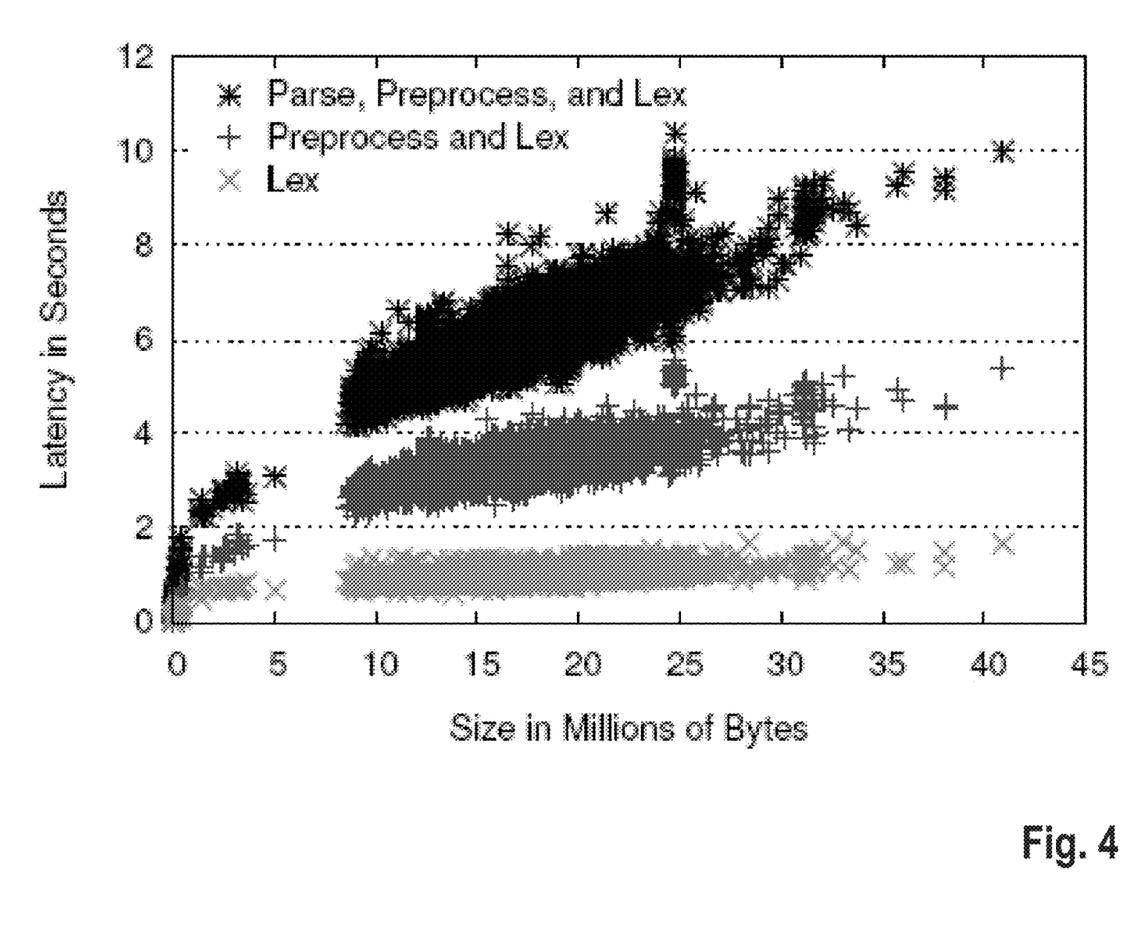
FIG. 4 plots the breakdown of the latency of a tested implementation.

FIG. 4 plots the breakdown of the latency of the tested implementation. It demonstrates that the performance of the tested implementation scaled roughly linearly with compilation unit size and lexing, preprocessing, and parsing each scale roughly linearly as well. Furthermore, most of the total latency was split between preprocessing and parsing. To provide a performance baseline, the cumulative latency distribution for gcc lexing, preprocessing, and parsing the 7,665 compilation units under allyeseonfig was measured. The timing data was gathered using gcc's-ftime-report command line option. The 50th, 90th, and $100^{th}$ percentiles are 0.18, 0.24, and 0.87 seconds, i.e., a factor 12-32 speedup compared to the tested implementation. It reflects that gcc does not have to preserve static conditionals and that gcc's C implementation has been carefully tuned for many years.

Figure 5:
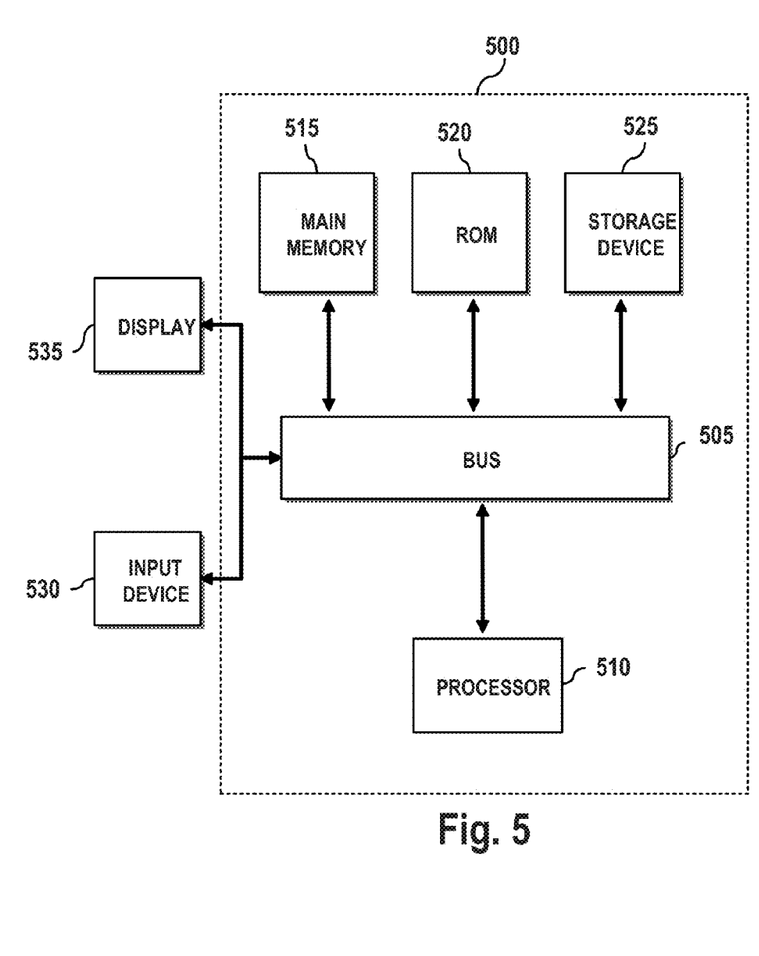
FIG. 5 is a block diagram of a computer system in accordance with an illustrative implementation.

FIG. 5 is a block diagram of a computer system in accordance with an illustrative implementation. The computer system or computing device 500 can be used to implement a configuration-preserving preprocessor and parser in accordance with one or more implementations of the present invention. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 510 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
one or more processors; and
one or more computer storage media storing one or more modules of computer program instructions executed by the one or more processors, the one or more modules of computer program instructions comprising:
a lexer module to:
generate a plurality of tokens from one or more source files, the one or
more source files including source code in a first programming language, the source code comprising a macro invocation containing one or more static conditionals that include a conditional expression and branch code that is operative when the conditional expression is true, and wherein various configurations are possible based upon the conditionals and the conditionals can alter the macro invocation by changing a name or argument of the macro invocation; and
a configuration-preserving preprocessor module to:
determine that a first static conditional in the macro invocation includes one or more nested static conditionals within the branch code associated with the first static conditional; and
hoist each of the one or more nested static conditionals around the macro invocation to a beginning of the branch code associated with the first static conditional, wherein each innermost branch code does not contain a static conditional, and wherein each possible configuration is preserved.

2. The system of claim 1, wherein the configuration-preserving preprocessor module further comprises instructions to convert each conditional expression into a boolean function.

3. The system of claim 2, wherein the configuration-preserving preprocessor module further comprises instructions to convert each static conditional into a member of a static conditional set, and wherein the member comprises the respective boolean function and tokens associated with the respective branch code.

4. The system of claim 2, wherein the configuration-preserving preprocessor module further comprises instructions to store a macro definition with an associated boolean function in a macro table, wherein the boolean function indicates when the macro is feasible.

5. The system of claim 4, wherein the configuration-preserving preprocessor module further comprises instructions to remove infeasible entries from the macro table.

6. The system of claim 2, wherein the boolean function is represented by a binary decision diagram.

7. A method comprising:
generating, by a lexer module executed by the one or more processors, a plurality of tokens from one or more source files, the one or more source files including source code in a first programming language, the source code comprising a macro invocation containing one or more static conditionals that include a conditional expression and branch code that is operative when the conditional expression is true, and wherein various configurations are possible based upon the conditionals and the conditionals can alter the macro invocation by changing a name or argument of the macro invocation;
determining, by a configuration-preserving preprocessor module executed by the one or more processors, that a first static conditional in the macro invocation includes one or more nested static conditionals within the branch code associated with the first static conditional; and
hoisting, by the configuration-preserving preprocessor module executed by the one or more processors, each of the one or more nested static conditionals around the macro invocation to a beginning of the branch code associated with the first static conditional, wherein each innermost branch code does not contain a static conditional, and wherein each possible configuration is preserved.

8. The method of claim 7, further comprising converting each conditional expression into a boolean function, wherein the boolean function is a function that takes two inputs.

9. The method of claim 8, further comprising converting each static conditional into a member of a static conditional set, and wherein the member comprises the respective boolean function and tokens associated with the respective branch code.

10. The method of claim 8, further comprising storing a macro definition with an associated boolean function in a macro table, wherein the boolean function indicates when the macro is feasible.

11. The method of claim 10, further comprising removing infeasible entries form the macro table.

12. The method of claim 8, wherein the boolean function is a binary decision diagram.

13. A non-transitory computer-readable medium having instructions stored thereon, the instructions comprising:

instructions to generate, by a lexer module executed by the one or more processors, a plurality of tokens from one or more source files, the one or more source files including source code in a first programming language, the source code comprising a macro invocation containing one or more static conditionals that include a conditional expression and branch code that is operative when the conditional expression is true, and wherein various configurations are possible based upon the conditionals and the conditionals can alter the macro invocation by changing a name or argument of the macro invocation;

instructions to determine, by a configuration-preserving preprocessor module executed by the one or more processors, that a first static conditional in the macro invocation includes one or more nested static conditionals within the branch code associated with the first static conditional; and instructions to hoist, by the configuration-preserving preprocessor module executed by the one or more processors, each of the one or more nested static conditionals around the macro invocation to a beginning of the branch code associated with the first static conditional, wherein each innermost branch code does not contain a static conditional, and wherein each possible configuration is preserved.

14. The non-transitory computer-readable medium of claim 13, further comprising converting each conditional expression into a boolean function, wherein the boolean function is a function that takes two inputs.

15. The non-transitory computer-readable medium of claim 14, further comprising converting each static conditional into a member of a static conditional set, and wherein the member comprises the respective boolean function and tokens associated with the respective branch code.

16. The non-transitory computer-readable medium of claim 14, further comprising storing a macro definition with an associated boolean function in a macro table, wherein the boolean function indicates when the macro is feasible.

17. The method of claim 16, further comprising removing infeasible entries form the macro table.

18. The non-transitory computer-readable medium of claim 14, wherein the boolean function is a binary decision diagram.

* * * * *